(12) United States Patent
Xu

(10) Patent No.: US 8,107,484 B2
(45) Date of Patent: Jan. 31, 2012

(54) METHOD AND DEVICE FOR ADVERTISING ROUTING INFORMATION AND METHOD AND SYSTEM FOR IMPLEMENTING PACKET ROUTING

(75) Inventor: Xiaohu Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 116 days.

(21) Appl. No.: 12/486,136

(22) Filed: Jun. 17, 2009

(65) Prior Publication Data

US 2009/0257439 A1    Oct. 15, 2009

Related U.S. Application Data

(63) Continuation of application No. PCT/CN2008/071416, filed on Jun. 24, 2008.

(30) Foreign Application Priority Data

Jun. 25, 2007    (CN) .......................... 2007 1 0123476

(51) Int. Cl.
    H04L 12/28    (2006.01)
    H04L 12/56    (2006.01)
(52) U.S. Cl. ....................................................... 370/401
(58) Field of Classification Search .................. None
    See application file for complete search history.

(56) References Cited

U.S. PATENT DOCUMENTS

| 6,330,614 | B1 * | 12/2001 | Aggarwal et al. ............ | 709/236 |
| 6,865,184 | B2 * | 3/2005 | Thubert et al. ................ | 370/401 |
| 7,519,010 | B1 * | 4/2009 | Aggarwal et al. ............ | 370/254 |
| 2006/0262735 | A1 | 11/2006 | Guichard et al. | |

FOREIGN PATENT DOCUMENTS

| CN | 1697408 A | 11/2005 |
| CN | 1745558 A | 3/2006 |
| CN | 1832454 A | 9/2006 |
| JP | 2005-33470 | 2/2005 |
| JP | 2006221367 A | 8/2006 |

OTHER PUBLICATIONS

European Patent Office Communication pursuant to Article 94(3) EPC, European Examination Report for Application No. 08757825.8, mailed Jan. 17, 2010, Huawei Technologies Co., Ltd 4 pgs.

(Continued)

*Primary Examiner* — Ayaz Sheikh
*Assistant Examiner* — Blanche Wong
(74) *Attorney, Agent, or Firm* — Finnegan, Henderson, Farabow, Garrett & Dunner LLP

(57) ABSTRACT

The present disclosure discloses a method and device for advertising routing information and a method and system for implementing packet routing. The method for advertising routing information includes a routing information advertising device that obtains its address information; the routing information advertising device adds the address information to routing information to advertise; and the routing information advertising device advertises the routing information that carries the address information. With the technical solution of the present disclosure, the number of routing tables in a backbone network may be greatly reduced. This minimizes the rise of router costs and effectively avoids slower route convergence. In addition, a router in the backbone network can dynamically obtain address information of a core router that advertises an aggregate prefix, such that it may be easier to implement registration, update and query the mapping between a more detailed address prefix and a border router.

6 Claims, 4 Drawing Sheets

OTHER PUBLICATIONS

International Search Report from P.R. China in International Application No. PCT/CN2008/071416 mailed Oct. 9, 2008.

English translation of the Written Opinion of the International Searching Authority for International application No. PCT/CN2008/071416, mailed Oct. 9, 2008, 7 pgs.

European Patent Office Communication enclosing the extended European search report, pursuant to Rule 62 EPC, the supplementary European search report (Art. 153(7) EPC) and the European search opinion for application No. 08757825.8, dated Nov. 26, 2009, 8 pgs.

European Patent Office Communication pursuant to Article 94(3) EPC for application No. 08757825.8, dated Mar. 12, 2010, 1 pg.

CISCO, "Understanding Route Aggregation in BGP", Aug. 10, 2005, 9 pgs., retrieved from the internet: URL: http://www.cisco.com/en/US/tech/tk365/technologies_tech_note09186a0080094826.shtml.

Zhang, Xinyang, "Scaling IP Routing with the Core Router-Integrated Overlay", Network Protocols, 2006, ICNP '06, Proceedings of the 2006 $14^{th}$ IEEE International Conference on IEEE, PI, Nov. 1, 2006, 10 pgs.

Francis, Paul, et al. "A White Paper on Reducing FIB Size through Virtual Aggregation", retrieved from the internet: URL: http://www.cs.cornell.edu/People/francis/va-wp.pdf, Jun. 2008, 7 pgs.

European Patent Office Communication pursuant to Article 94(3) EPC, European search opinion for Application No. 08757825.8-2416, mailed May 31, 2011, Huawei Technologies Co., Ltd. (5 pgs.).

First Chinese Office Action dated (mailed) Mar. 2, 2011, issued in related Chinese Application No. 200710123476.4 Huawei Technologies Co., Ltd.

Zhang, X. et al., "Scaling IP Routing with the Core Router-Integrated Overlay," IEEE, 2006.

Second Chinese Office Action issued in related Chinese Application No. 200710123476.4 Mailing Date: Aug. 17, 2011, Huawei Technologies Co. Ltd.

* cited by examiner

US 8,107,484 B2

METHOD AND DEVICE FOR ADVERTISING ROUTING INFORMATION AND METHOD AND SYSTEM FOR IMPLEMENTING PACKET ROUTING

CROSS REFERENCE

This application is a continuation of International Patent Application No. PCT/CN2008/071416, filed on Jun. 24, 2008, entitled "Method and Device for Advertising Routing Information and Method and System for Implementing Packet Routing", which claims the priority of Chinese Patent Application No. 200710123476.4, filed with the Chinese Patent Office on Jun. 25, 2007, entitled "Method and Device for Advertising Routing Information and Method and System for Implementing Packet Routing", both of which are incorporated herein by reference in their entirety.

FIELD OF THE DISCLOSURE

The present disclosure relates to network communication technologies, and in particular, to a method and device for advertising routing information and a method and system for implementing packet routing.

BACKGROUND

With the swift progress of communication technologies, routing tables in an Internet backbone network are increasing rapidly. As a result, it is necessary to upgrade or renovate routers that process the routing tables so that the routers possess relevant processing capabilities. This leads to the rise of router costs and slower route convergence.

SUMMARY

Embodiments of the disclosure provide a method and device for advertising routing information, and a method and system for implementing packet routing so as to reduce the number of the routing tables that a router needs to maintain.

A method for advertising routing information includes the following steps:

obtaining, by a routing information advertising device, address information of the routing information advertising device;

adding, by the routing information advertising device, the address information to routing information to be advertised; and advertising, by the routing information advertising device, the routing information that carries the address information.

A routing information advertising device includes the following units:

an address information obtaining unit, adapted to obtain address information of the routing information advertising device;

an address information adding unit, adapted to add the address information to routing information to be advertised; and a routing information advertising unit, adapted to advertise the routing information that carries the address information.

A method for implementing packet routing, where a core router in a backbone network advertises routing information that carries address information of the core router and a border router that receives the routing information, if an edge network connected with the border router includes a more detailed address prefix covered by an address prefix advertised in the routing information, registers a mapping relationship between the more detailed address prefix information and the border router address at the core router, includes the following steps:

receiving, by the core router, a packet which is forwarded by a router to the core router according to aggregate address prefix information advertised by the core router in a routing table of the router;

searching for, by the core router, a best route matching a destination address of the packet according to the mapping relationship between address prefix information and border router address information registered on the core router, where the best route is a route in longest match with the destination address; and forwarding, by the core router, the packet to a corresponding border router via a tunnel destined for the border router according to the obtained best route.

A system for implementing packet routing includes a core router and a border router, wherein:

the core router is adapted to:

store a mapping relationship between an address prefix and a border router address, wherein the address prefix is an address prefix included in an edge network connected with the border router and also a more detailed address prefix covered by an address prefix in routing information advertised by the core router;

search for information of a more detailed address prefix corresponding to a destination address of a received packet according to the mapping relationship and forward the packet via a tunnel destined for a corresponding border router according to the border router address information mapped to the more detailed address prefix; and the border router is adapted to:

register a mapping relationship between a more detailed address prefix information and the border router address at the core router if an edge network connected with the border router includes the more detailed address prefix covered by an aggregate address prefix advertised by the core router.

A method for implementing packet routing, where a core router in a backbone network advertises aggregate address prefix information that carries address information of the core router and a border router that receives the information, if an edge network connected with the border router includes a more detailed address prefix covered by an address prefix advertised in the routing information, registers a mapping relationship between the more detailed address prefix information and the border router address on the core router, includes the following steps:

searching for, by the border router, a best route matching a destination address of a packet requiring forwarding, and if the best route is the aggregate prefix route, requesting the core router that advertises the aggregate prefix route for border router address information corresponding to an address prefix in longest match with the destination address of the packet according to the received address information of the core router;

searching for, by the core router, the address prefix in longest match with the destination address of the packet and sending border router address information corresponding to the address prefix to the border router that initiates the request according to the mapping relationship; and forwarding, by the border router that initiates the request, the packet via a tunnel destined for a border router indicated in the address information upon reception of the address information.

A system for implementing packet routing includes a core router, an ingress tunnel border router, and an egress tunnel border router, where:

the core router is adapted to:

store a mapping relationship between an address prefix and a border router address, where the address prefix is an address prefix included in an edge network connected with the ingress tunnel border router and also a more detailed address prefix covered by an address prefix in routing information advertised by the core router;

receive a mapping request message sent by the ingress tunnel border router, wherein the message requests border router address information corresponding to an address prefix in longest match with a specified destination address, search for the address prefix in longest match with the destination address and determine border router address information corresponding to the address prefix according to the mapping it stores, and send the border router address information to the ingress tunnel border router that initiates the request;

the ingress tunnel border router is adapted to:

upon reception of a packet, if a best route corresponding to the destination address of the packet is an aggregate prefix route, request the core router that advertises the aggregate prefix route for border router address information corresponding to the address prefix in longest match with the destination address of the packet;

forward the packet via a tunnel destined for an egress tunnel border router indicated in the border router address information according to the border router address information returned by the core router; and the egress tunnel border router is adapted to:

receive the packet and route and forward the packet according to routing table of the egress tunnel border router.

In an embodiment of the disclosure, only the aggregate route and one interface address of the each router need to be maintained in an Internet backbone network. As a result, the maintenance of numerous detailed prefix routes and therefore the number of routing tables is greatly reduced. Consequently, router costs are minimized and slower route convergence is avoided. In addition, with the method provided by the present disclosure for advertising routing information, a router in the backbone network can dynamically obtain address information of a core router that advertises an aggregate prefix, so that it may be easier to implement registration, update and query of the mapping between a more detailed address prefix and a border router. The packet routing process is therefore easier and more flexible.

DETAILED DESCRIPTION

In an embodiment of the disclosure, the amount of routing tables in an Internet backbone network is reduced by changing the mesh routing structure of the conventional Internet backbone network to a tree routing structure. Thus, in the Internet backbone network, only a core router advertises aggregate address prefixes while a more detailed address prefix information included in the aggregate address prefixes is not diffused in the Internet backbone network. Accordingly, a border router in the Internet backbone network registers mapping information at the core router that advertises aggregate address prefixes. The mapping information denotes a mapping relationship between the more detailed address prefix information and the border router address such that the corresponding border router may be found according to the mapping relationship when a packet is routed, thus realizing forwarding of the packet.

In accordance with the above disclosure, a method for advertising routing information is provided in an embodiment of the disclosure which is described in detail hereinafter with reference to the accompanying drawings.

Figure 1:
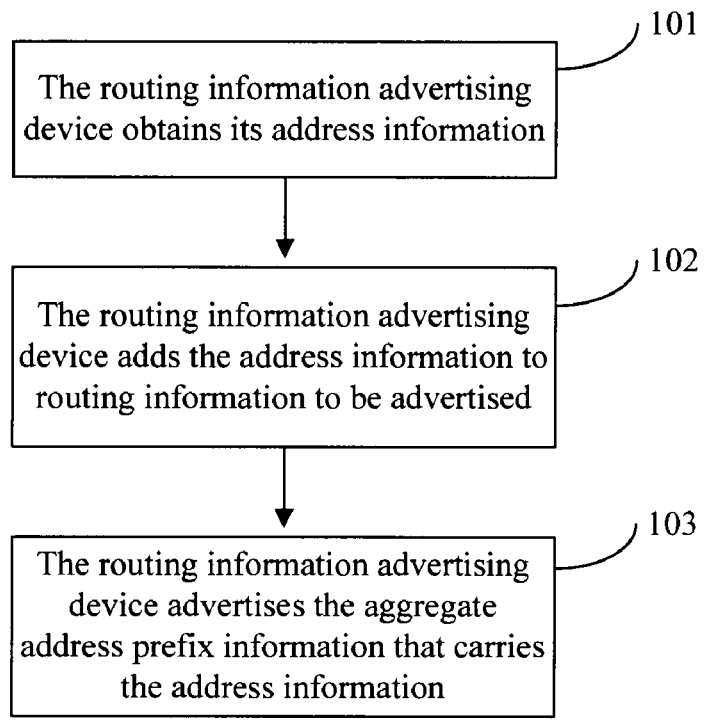
FIG. 1 is a flowchart of a method for advertising routing information according to an embodiment of the disclosure.

As shown in FIG. 1, a method for advertising routing information in an embodiment of the disclosure may include the following steps:

101. A routing information advertising device obtains its own address information.

In this embodiment of the disclosure, the routing information advertising device may be a core router and more specifically, the device may be a super router or a host.

In an embodiment of the disclosure, for example, the routing information advertising device is a super router. The address information obtained by the super router may be the Internet Protocol (IP) address of an interface of the super router. The interface IP address may be an IP address of a loopback interface or any other type of interface. In another embodiment of the disclosure, the routing information advertising device may obtain another type of its own address information provided that its own address information guarantees that another device may find the routing information advertising device according to the address information.

102. The routing information advertising device adds its own address information to the routing information to be advertised.

In an embodiment of the disclosure, the Interior Gateway Protocol (IGP) or Border Gateway Protocol (BGP) may be extended so that a Route Originator field can be carried in the prefix information of the routing information to be advertised. The Route Originator field identifies the origin of a route. The Route Originator field information is not to get lost regardless of whether the route is across Autonomous Systems (ASs) or across areas. When a re-advertisement is required between different routing protocols, the Route Originator field information is retained. The routing information advertising device adds its own address information to the Route Originator field so that the routing information advertising device's address information is added to the routing information to be advertised.

In another embodiment of the disclosure, another part of the routing information to be advertised may be extended so that the address information of the routing information advertising device is added to the extension part.

In addition, as in an implementation of the embodiments of the disclosure, if a routing protocol based on Internet Protocol version 4 (IPv4) is adopted, the Route Originator field may be 32 bits long; if a routing protocol based on Internet Protocol version 6 (IPv6) is adopted, the Route Originator field may be 128 bits long. The length and position of the Route Originator field may vary with the routing protocol.

103. The routing information advertising device advertises the routing information that carries its own address information.

In a preferred embodiment of the disclosure, the method may further include the following:

A border router that receives the routing information, if the edge network connected with the border router includes a more detailed address prefix covered by the address prefix advertised in the routing information, sends a mapping relationship registration message to the routing information advertising device according to the address information of the routing information advertising device carried in the routing information. The routing information advertising device stores the mapping relationship carried in the mapping relationship registration message, wherein the mapping relationship is that between the more detailed address prefix and an address of the border router. As such the address prefix advertised in the routing information can be an address prefix included in the edge network connected with the border router and also the more detailed address prefix covered in the address prefix advertised in the routing information. In this embodiment of the disclosure, a mapping table may be a database that contains mapping relationship and also a form of routing table. For example, the address prefix in a mapping relationship is the destination address prefix and the address of the corresponding border router is the next hop address. The distance from the routing information advertising device to the border router may be regarded as a cost of the route. Further, the registration and update of mapping information may be implemented via the BGP. Alternatively, a new protocol may be designed to implement the above function. Therefore, the mapping table may be regarded as a routing table similar to an IGP routing table or BGP routing table. The calculation and lookup operations on a routing table in the prior art may also be applicable to the mapping table.

Further, the method may include the following:

the border router sends a mapping relationship update message to the routing information advertising device according to the received address information of the routing information advertising device. Upon reception of the update message, the routing information advertising device updates the mapping relationship. The update may be triggered. For example, the border router may send an update message to the advertiser upon reception of super prefix advertisement information or the update message may be sent on a periodical basis; and/or the border router sends a mapping query message to the routing information advertising device according to the received address information of the routing information advertising device. The routing information advertising device queries the corresponding mapping relationship according to the mapping query message and returns the obtained mapping relationship to the border router. The border router sends a mapping query message to the router that advertises the super prefix upon reception of a packet from the edge network.

Another embodiment of the disclosure is described below to explain the specific implementation of the foregoing method.

Figure 2:
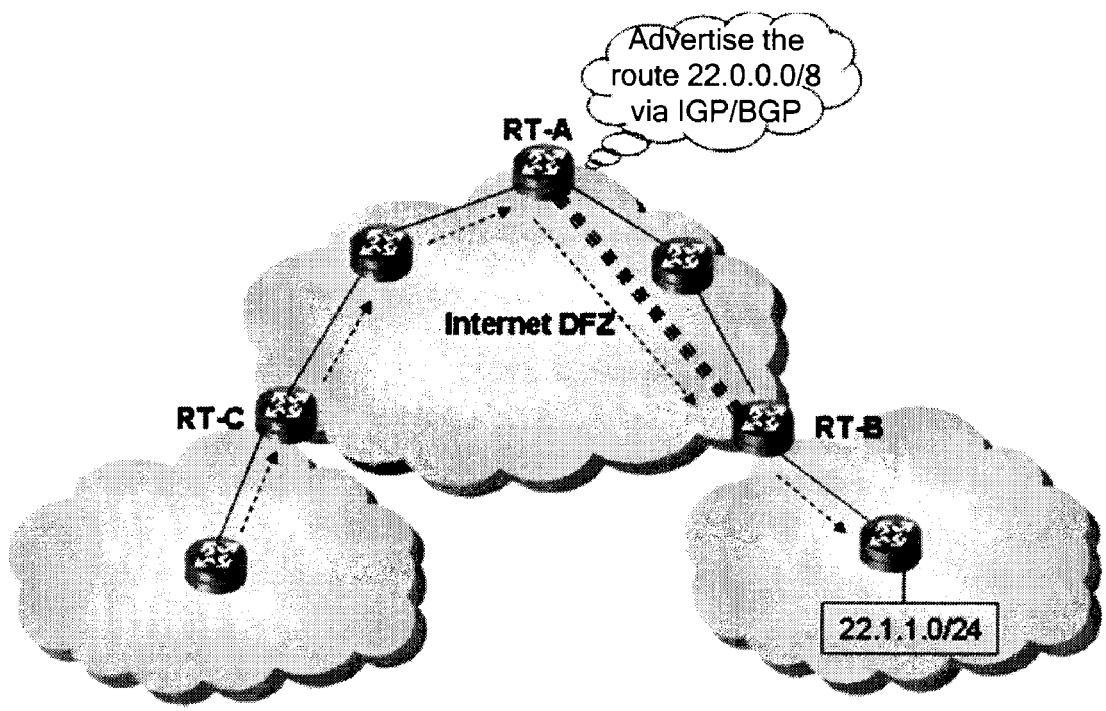
FIG. 2 shows a procedure of the method for advertising routing information according to an embodiment of the disclosure.

As shown in FIG. 2, in an embodiment of the disclosure, a core router RT-A advertises an aggregate address prefix information 22.0.0.0/8 via IGP or BGP. The address prefix information carries a Route Originator information, which may be 1.1.1.1, IP address of one interface of RT-A. A router directly connected with the 22.1.1.0/24 prefix router (the router with the 22.1.1.0/24 prefix is inside the edge network) or a border router RT-B connected with the edge network and the backbone network sends a mapping registration message to RT-A according to the address information 1.1.1.1 in the received aggregate address prefix information. The mapping registration message carries the mapping relationship between the more detailed prefix 22.1.1.0/24 and the IP address of RT-B.

Upon reception of the mapping registration message, RT-A stores the mapping relationship carried in the mapping registration message to complete registration of the mapping relationship of RT-B. Once RT-A, which acts as a core router, receives the mapping registration message, RT-A recognizes that when an IP packet destined for the 22.1.1.0/24 subnet is received, RT-A should first forward the packet to RT-B via a tunnel to RT-B. RT-B continues routing the packet until the packet is forwarded to the destination. Thus, mostly aggregate routes like 22.0.0.0/8 and the route to each router can be maintained in the Internet backbone network, without maintaining a large amount of more detailed routing information like 22.1.1.0/24. Thereby, the number of routing tables is greatly reduced.

Similarly, as to the foregoing registration process, RT-B may send an update message or query message to RT-A according to the received address information of RT-A. Upon reception of the message, RT-A completes the corresponding update or query according to the related content in the message.

Figure 3A:
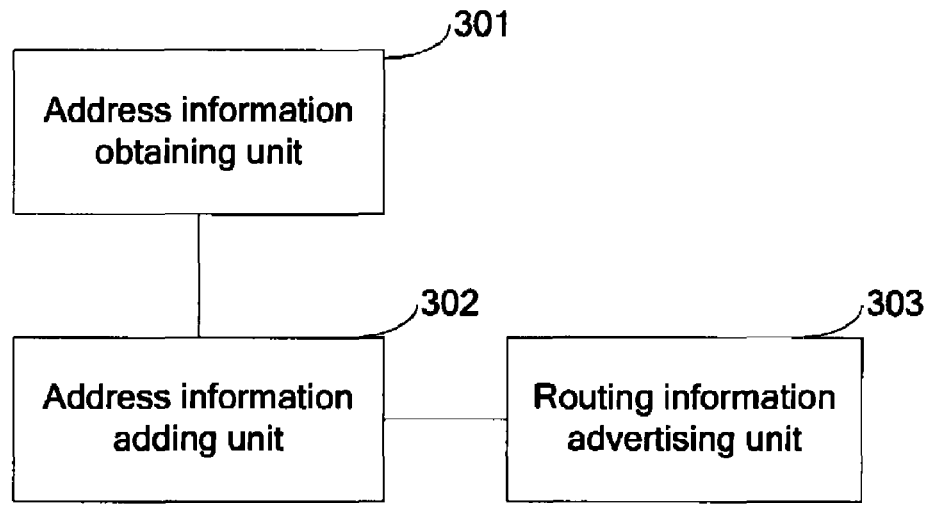
FIG. 3A and FIG. 3B show a routing information advertising device according to an embodiment of the disclosure.

According to the foregoing method, a device for advertising routing information is provided in an embodiment of the disclosure. As shown in FIG. 3A, the device includes the following units:

an address information obtaining unit 301, adapted to obtain address information of the routing information advertising device;

an address information adding unit 302, adapted to add the address information to the routing information to be advertised; and a routing information advertising unit 303, adapted to advertise the routing information that carries the address information.

Figure 3B:
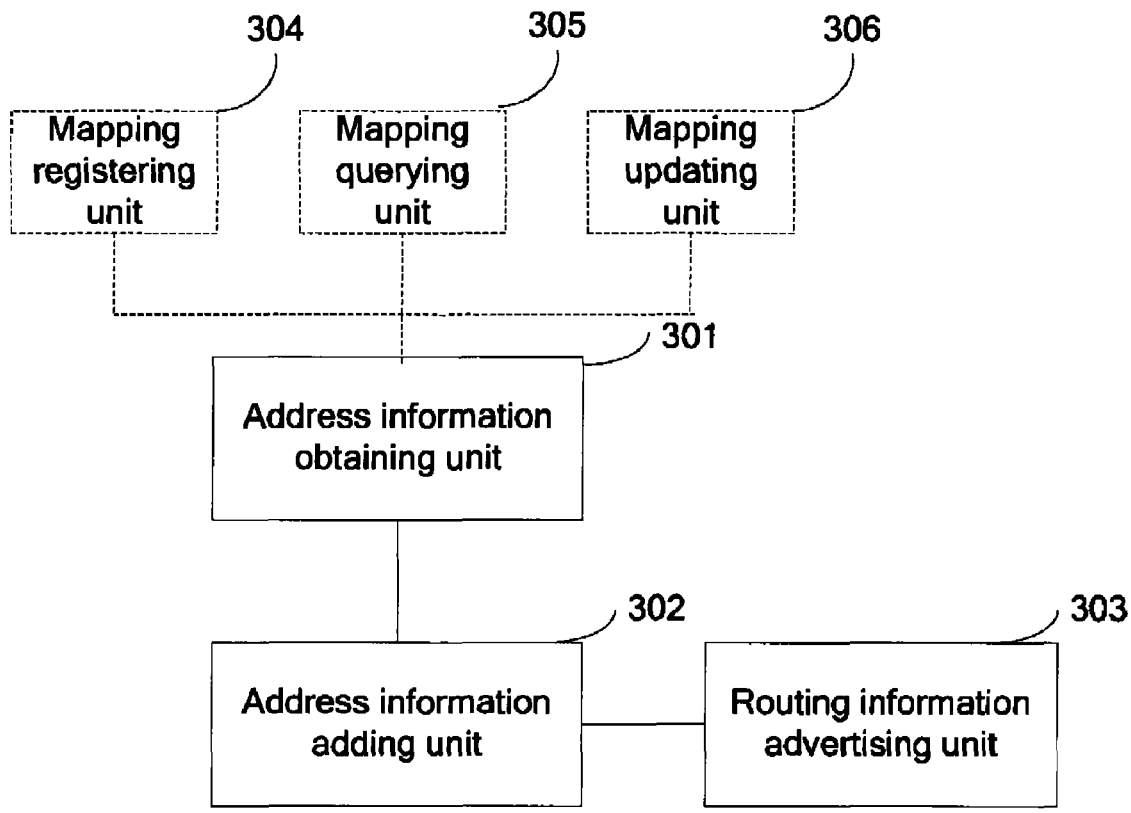

Further, as shown in FIG. 3B, the device may include:

a mapping registering unit 304, adapted to register the mapping relationship between the address prefix and the border router address information according to the mapping relationship carried in the mapping registration message upon reception of a mapping registration message sent from the border router; and/or a mapping querying unit 305, adapted to query the mapping relationship between the address prefix and the border router address information according to a mapping query message sent from the border router; and/or a mapping updating unit 306, adapted to update the mapping relationship between the address prefix and the border router address information according to a mapping update message sent from the border router.

In other embodiments of the disclosure, two methods for implementing packet routing are provided, detailed hereinafter.

Embodiment 1

Figure 4:
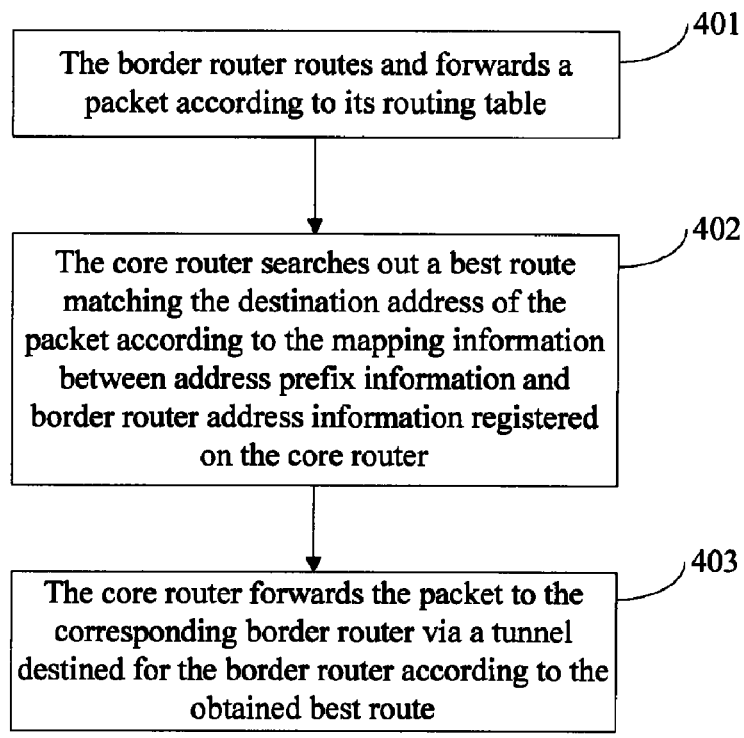
FIG. 4 is a flowchart of a method for implementing packet routing according to an embodiment of the disclosure.

The core router advertises routing information that carries its own address information. A border router that receives the routing information, if the edge network connected with the border router includes a more detailed address prefix covered by the address prefix advertised in the routing information, registers the mapping relationship between the more detailed address prefix and the border router address at the core router according to the address information, so as to complete registration of the mapping information of the border router at the core router. After the foregoing configuration of the core router, a method for implementing packet routing provided in the first embodiment, as shown in FIG. 4, includes the following steps:

401. The border router routes and forwards a packet according to its routing table.

402. When the border router forwards the packet to the core router according to the address information of the core router, the core router searches out a best route matching the destination address of the packet according to the mapping relationship between the address prefix and the border router address information registered on the core router. The best route may be a route in longest match with the destination address. This is consistent with the routing table lookup process of a router in the conventional techniques.

403. The core router forwards the packet to the corresponding border router via a tunnel destined for the border router according to the obtained best route.

In a preferred embodiment of the disclosure, after step 403, the method may further include the following:

The border router continues routing and forwarding of the received packet until the packet reaches the destination host.

The method provided in FIG. 4 is described in detail as follows:

As shown in FIG. 2, when another router such as RT-C in the network needs to forward a packet to a host with the address 22.1.1.2 in the 22.1.1.0/24 network segment, the router determines the best route to 22.1.1.2 is 22.0.0.0/8 according to the destination address 22.1.1.2 of the packet based on the longest match rule. Then, according to the address information of RT-A in the routing information advertised by RT-A, the packet is forwarded hop by hop until the packet reaches RT-A.

Upon receiving the packet, RT-A determines the detailed prefix information of the border router corresponding to the destination IP address according to the destination IP address 22.1.1.0/24, and forwards the packet to RT-B according to the detailed prefix information. RT-B continues routing and forwarding the received packet until the packet reaches the destination host.

According to the method provided in the first embodiment, a system for implementing packet routing is provided in an embodiment of the disclosure. The system includes a core router and a border router.

The core router is adapted to advertise its own address information when advertising routing information by placing its own address information in the routing information. According to this embodiment of the disclosure, when the core router advertises aggregate address prefix information, the core router advertises its own address information by placing its own address information in the aggregate address prefix information.

The core router can also be adapted to store the mapping relationship between an address prefix and a border router address. According to this embodiment of the disclosure, the address prefix is the address prefix included in the edge network connected with the border router and also the more detailed address prefix covered by the address prefix in the routing information advertised by the core router.

When the packet is forwarded to the core router, the core router searches out information of the detailed address prefix corresponding to the destination address of the packet according to the mapping relationship and forwards the packet via a tunnel destined for the corresponding border router according to the border router address information mapped to the detailed address prefix.

The border router is adapted to:

register the mapping relationship between the detailed address prefix and the border router address at the core router if the edge network connected with the border router includes a more detailed address prefix covered by the aggregate address prefix advertised by the core router; and route and forward the received packet according to the destination address of the packet.

Embodiment 2

Figure 5:
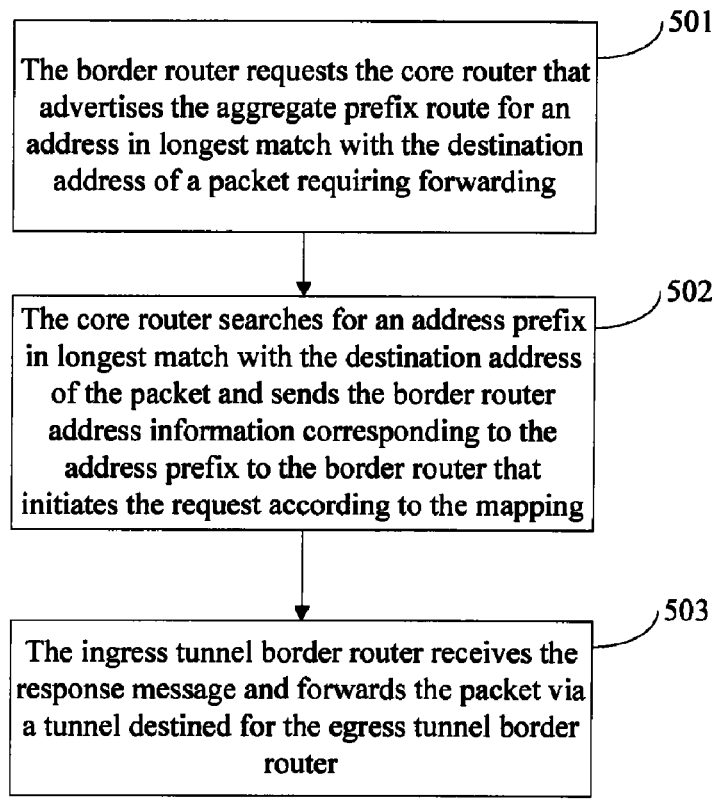
FIG. 5 is a flowchart of a method for implementing packet routing according to another embodiment of the disclosure.

The core router advertises aggregate address prefix information that carries its own address information; the core router is in a Internet backbone network. A border router that receives the aggregate address prefix information, if the edge network connected with the border router includes a more detailed address prefix covered by the address prefix advertised in the aggregate address prefix information, registers the mapping relationship between the more detailed address prefix and the border router address at the core router according to the address information, so as to complete registration of the mapping relationship information of the border router at the core router. After the foregoing configuration of the core router, a method for implementing packet routing provided in the second embodiment, as shown in FIG. 5, includes the following steps:

501. Border router 1 searches out a best route matching the destination address of a packet requiring forwarding. If the best route is an interior route of the edge network connected with border router 1, border router 1 forwards the packet according to the conventional art. If the best route is an aggregate route advertised by the core router, border router 1 requests the core router that advertises the aggregate address prefix information for an address in longest match with the destination address of the packet, which is the address of border router 2 corresponding to the prefix.

502. The core router searches out the address prefix in longest match with the destination address of the packet and sends a response message to border router 1 that initiates the request, wherein the response message carries the address information of border router 2 corresponding to the address prefix.

To better distinguish the two border routers, border router 1 is hereinafter referred to as an ingress tunnel border router and border router 2 in the response message is referred to as an egress tunnel border router. The role of ingress or egress tunnel border router depends on the flow direction of the packet. For example, for packets sent from the edge network connected with border router A to the edge network connected with border router B, A is the ingress tunnel border router and B is the egress tunnel border router. On the contrary, for packets sent from the edge network connected with border router B to the edge network connected with border router A, B is the ingress tunnel border router and A is the egress tunnel border router.

503. After the ingress tunnel border router receives the response message, the ingress tunnel border router forwards the packet via a tunnel destined for the egress tunnel border router, indicated in the response message.

In a preferred embodiment of the disclosure, after step 503, the method may further include:

The egress tunnel border router further routes and forwards the packet according to the destination address of the packet until the packet is delivered to the destination host.

Figure 6:
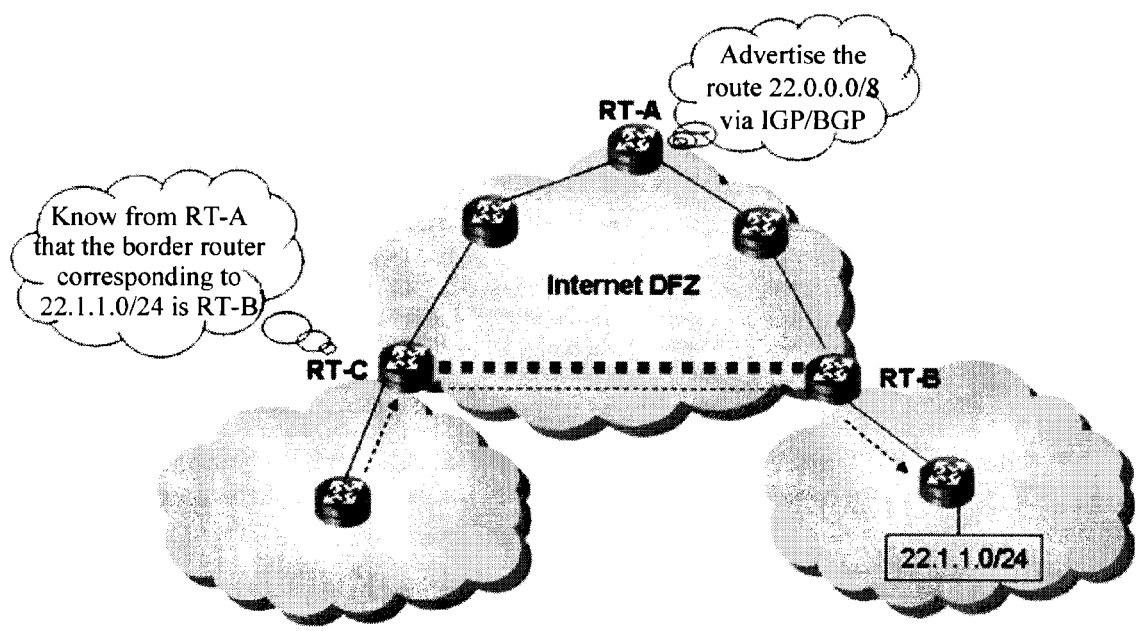
FIG. 6 shows a procedure of the method for implementing packet routing according to an embodiment of the disclosure.

The method provided in FIG. 5 may be described in detail as follows:

As shown in FIG. 6, after RT-C receives a packet requiring forwarding, RT-C sends a query request to the core router RT-A according to the address 1.1.1.1 of RT-A sent by RT-A when RT-A advertises aggregate address prefix information, requesting to obtain mapping information of the best route corresponding to the destination address 22.1.1.2. RT-A determines that the best route to 22.1.1.2 is 22.1.1.0/24. Then RT-A determines the mapping information corresponding to 22.1.1.0/24 according to the mapping registered on RT-A by border routers and sends the mapping information to RT-C. RT-C sends the packet via the tunnel destined for border router RT-B. RT-B continues routing and forwarding until the packet reaches the destination host.

According to the method provided in the second embodiment, a system for implementing packet routing is provided in an embodiment of the disclosure. The system includes a core router, an ingress tunnel border router and an egress tunnel border router.

The core router may be adapted to advertise its own address information when advertising routing information by placing the address information in the routing information. In this embodiment of the disclosure, when the core router advertises aggregate address prefix information, the core router advertises its own address information by placing the address information in the aggregate address prefix information.

The core router may also be adapted to store the mapping relationship between an address prefix and a border router address. In this embodiment of the disclosure, the address prefix is the address prefix included in the edge network connected with the ingress tunnel border router and also the more detailed address prefix covered by the address prefix in the routing information advertised by the core router.

The core router receives a mapping request message sent by the ingress tunnel border router, where the message requests border router address information corresponding to the address prefix in longest match with the specified destination address. The core router searches out the address prefix in longest match with the destination address and determines the border router address information corresponding to the address prefix according to the mapping relationship the core router stores, and sends the border router address information to the ingress tunnel border router that initiates the request.

The ingress tunnel border router may be adapted to:

upon reception of a packet, if the best route corresponding to the destination address of the packet is an aggregate prefix route, request the core router that advertises the aggregate prefix route for border router address information corresponding to the address prefix in longest match with the destination address of the packet; and forward the packet via a tunnel destined for an egress tunnel border router indicated in the border router address information according to the border router address information returned by the core router.

The egress tunnel border router may be adapted to:

route and forward a received packet according to its routing table.

In the embodiments of the disclosure, the packet may be an IP packet or another type of packet. The embodiments of the disclosure may be implemented based on IGP or BGP, or another type of protocol.

Those skilled in the art understand that all or part of the steps in the method provided according to foregoing embodiments of the present disclosure can be implemented by hardware following instructions of a program. The program may be stored in a computer readable storage medium, such as a Read-Only Memory (ROM), a Random Access Memory (RAM), a magnetic disk or a compact disk.

The present embodiments of the disclosure have been given by way of illustration and the disclosure is not limited to such embodiments. It is apparent that those skilled in the art can make various modifications and variations to the present disclosure without departing from the spirit and scope of the present disclosure. The present disclosure is intended to cover such modifications and variations provided that they fall in the scope of protection defined by the following claims or their equivalents.

What is claimed is:

1. A method for implementing packet routing, wherein a core router in a backbone network advertises routing information that carries address information of the core router, and a border router that receives the routing information, if an edge network connected with the border router comprises a more detailed address prefix covered by an address prefix advertised in the routing information, registers a mapping relationship between the more detailed address prefix information and the border router address at the core router, comprising:

receiving, by the core router, a packet which is forwarded by a router to the core router according to aggregate address prefix information advertised by the core router in a routing table of the router;

searching for, by the core router, a best route matching a destination address of the packet according to the mapping relationship between address prefix information and border router address information registered on the core router, wherein the best route is a route in longest match with the destination address; and forwarding, by the core router, the packet to a corresponding border router via a tunnel destined for the border router according to the obtained best route.

2. The method of claim 1, after the corresponding border router receives the packet, further comprising:

continuing, by the border router, routing and forwarding the received packet until the packet reaches a destination host.

3. A system for implementing packet routing, comprising a core router and a border router, wherein:

the core router is adapted to:

store a mapping relationship between an address prefix and a border router address, wherein the address prefix is an address prefix comprised in an edge network connected with the border router and also a more detailed address prefix covered by an address prefix in routing information advertised by the core router;

search for information of a more detailed address prefix corresponding to a destination address of a received packet according to the mapping relationship and forward the packet via a tunnel destined for a corresponding border router according to the border router address information mapped to the more detailed address prefix; and the border router is adapted to:

register a mapping relationship between a more detailed address prefix information and the border router address at the core router, if an edge network connected with the border router comprises the more detailed address prefix covered by an aggregate address prefix advertised by the core router.

4. A method for implementing packet routing, wherein a core router in a backbone network advertises aggregate prefix routing information that carries address information of the core router and a border router that receives the routing information, if an edge network connected with the border router comprises a more detailed address prefix covered by an address prefix advertised in the routing information, registers a mapping relationship between the more detailed address prefix information and the border router address on the core router, comprising:

searching for, by the border router, a best route matching a destination address of a packet requiring forwarding, and if the best route is the aggregate prefix route, requesting the core router that advertises the aggregate prefix route for border router address information corresponding to an address prefix in longest match with the destination address of the packet according to the received address information of the core router;

searching for, by the core router, the address prefix in longest match with the destination address of the packet and sending border router address information corresponding to the address prefix to the border router that initiates the request according to the mapping relationship; and forwarding, by the border router, the packet via a tunnel destined for a border router indicated in the address information upon reception of the address information.

5. The method of claim 4, further comprising: continuing, by the border router indicated in the address information upon reception of the forwarded packet, routing and forwarding the packet until the packet reaches a destination host.

6. A system for implementing packet routing, comprising a core router, an ingress tunnel border router, and an egress tunnel border router, wherein:

the core router is adapted to:

store a mapping relationship between an address prefix and a border router address, wherein the address prefix is an address prefix comprised in an edge network connected with the ingress tunnel border router and also a more detailed address prefix covered by an address prefix in routing information advertised by the core router;

receive a mapping request message sent by the ingress tunnel border router, wherein the message requests border router address information corresponding to an address prefix in longest match with a specified destination address, search for the address prefix in longest match with the destination address and determine border router address information corresponding to the address prefix according to the mapping it stores, and send the border router address information to the ingress tunnel border router that initiates the request;

the ingress tunnel border router is adapted to:

upon reception of a packet, if the best route corresponding to the destination address of the packet is an aggregate prefix route, request the core router that advertises the aggregate prefix route for border router address information corresponding to an address prefix in longest match with the destination address of the packet;

forward the packet via a tunnel destined for an egress tunnel border router indicated in the border router address information according to the border router address information returned by the core router; and the egress tunnel border router is adapted to:

receive the packet and route and forward the packet according to routing table of the egress tunnel border router.

\* \* \* \* \*